United States Patent [19]

Rumack

[11] Patent Number: 4,816,549

[45] Date of Patent: Mar. 28, 1989

[54] TOLUENE SOLUBLE POLYAMIDE RESIN FROM POLYMERIZED FATTY ACID AND 1,2-DIAMINO CYCLOHEXANE

[75] Inventor: Daniel T. Rumack, Langhorne, Pa.

[73] Assignee: Union Camp Corporation, Wayne, N.J.

[21] Appl. No.: 142,603

[22] Filed: Jan. 11, 1988

[51] Int. Cl.⁴ .............................................. C08G 69/34
[52] U.S. Cl. ................................. 528/336; 524/606; 528/338; 528/339.3; 528/340; 528/346
[58] Field of Search ................... 528/336, 339.3, 346, 528/338, 340

[56] References Cited

U.S. PATENT DOCUMENTS 3,595,816  7/1971  Barrett ............................. 528/339.3

Primary Examiner—Harold D. Anderson
Attorney, Agent, or Firm—Edward J. Sites

[57] ABSTRACT

Polyamide resins are produced by reacting diamines, polymeric fatty acids, and monoamines. The monoamine component serves as a chain stopper and renders the polyamide resin product soluble in toluene. The resulting resins are especially useful as binder components in printing inks, and are distinguished by their ready solubility in toluene alone.

4 Claims, No Drawings

TOLUENE SOLUBLE POLYAMIDE RESIN FROM POLYMERIZED FATTY ACID AND 1,2-DIAMINO CYCLOHEXANE

The invention relates to polyamide resins which are soluble in toluene and useful as binder components in printing ink compositions.

BACKGROUND OF THE INVENTION

The prior art is replete with descriptions of polyamide resins and methods of their preparation. Polyamide resins derived from polymeric fatty acids are widely used as binder components in printing inks and the like because of their properties including good adhesion and toughness; see for example U.S. Pat. No. 3,037,871. One problem encountered is that the polyamides which have conventionally been used in the printing inks are required to be dissolved with specific alcohols or with a combination of solvents consisting of an alcohol and a hydrocarbon solvent; typically, toluene. The use of mixed solvents is a considerable problem because of the need for recovery of the solvents. Furthermore, as a result of more stringent environmental regulations, the printing industry is desirous of using materials which are soluble in a single solvent. Toluene is one solvent that printers are able to readily recover in the printing process. Co-solvents such as alcohol become, in effect, contaminants; therefore, the printing industry desires to have resins which are solvent soluble in toluene alone. Among the other requirements for the resins is that they also have relatively high softening points so that when the paper is heated to remove the solvent, the polyamide does not become tacky and cause adhesion of overlaying layers of papers.

A key to achieving polyamide resins having a high degree of solubility in toluene is to terminate the resin chains during polymerization with a monoamine of a specific class. Chain-termination of certain polyamides with monoamines as a control of molecular weight has been described in the prior art; see for example the description given in the U.S. Pat. No. 3,420,789.

The polyamide resins of the present invention are soluble in toluene and meet the specifications desired of a resin binder in printing ink compositions, finding a use as such a binder component.

SUMMARY OF THE INVENTION

The invention comprises a polyamide resin having a solubility of at least about five weight percent in toluene, at room temperature, said polyamide being the reaction product of (a) about 5 to 35 equivalent percent of a monoamine of the formula:

wherein R is an aliphatic or cycloaliphatic hydrocarbyl group having 2 to 25 carbon atoms, inclusive;

(b) about 95 to 65 equivalent percent of a diamine selected from the group consisting of 1,2-diaminocyclohexane and mixtures containing at least about 60 equivalent percent of 1,2-diaminocyclohexane in combination with other cycloaliphatic or aliphatic diamines; and (c) 75-100 equivalent percent of a polymerized fatty acid (d) 0-25 equivalent percent of an aliphatic or cycloaliphatic diacid having 4 to 22 carbon atoms or lower aliphatic (for example 1-6 carbon atoms) and esters thereof.

The term "room temperature" as used herein means a temperature within the range of from about 20° to 30° C.

The term "aliphatic hydrocarbyl" as used herein means the monovalent moiety obtained upon removal of a hydrogen atom from an acyclic hydrocarbon. Repesentative of aliphatic hydrocarbyl are alkyl of 2 to 25 carbon atoms, inclusive, such as ethyl, propyl, butyl, pentyl, hexyl, heptyl, octyl, nonyl, undecyl, decyl, dodecyl, octadecyl, nondecyl, eicosyl, heneicosyl, docosyl, tricosyl, tetracosyl, pentacosyl and the isomeric forms thereof; alkenyl of 2 to 25 carbon atoms, inclusive, such as vinyl, alkyl, butenyl, pentenyl, hexenyl, octenyl, nonenyl, decenyl, undececyl, pentacosynyl and isomeric forms thereof.

The term "cycloaliphatic hydrocarbyl" as used herein means the monovalent hydrocarbyl represented by cycloalkyl of 3 to 8 carbon atoms, inclusive, such as cyclopropyl, cyclobutyl, cyclopentyl, cyclohexyl, cycloheptyl, cyclooctyl and the like;

DETAILED DESCRIPTION OF THE PREFERRED EMBODIMENTS OF THE INVENTION

The polyamide compositions of the invention are characterized in part by a softening point within the range of from about 60° C. to about 200° C., and a solubility in toluene of at least about 5 weight percent (determined at room temperatures). The resins of the invention are substantially neutral, i.e.; the acid and amine numbers are generally each less than 10, preferably less than 5.

The polyamide resins of the invention will generally have a weight average molecular weight ($M_w$) of about 1000 to about 12,000; as determined by membrane osmoetry; J. Herold, G. Meyerhoff, Evr. Polym, J. 15,525 (1979).

The polyamide resins of the invention may be prepared by controlling the reaction used in preparation of the polyamide. In accordance with this invention, the reactants comprise a polymeric fatty acid, a diamine and a monoamine; wherein the monoamine effectively acts as a chain-stopper and provides toluene solubility to the polymer.

The reactants employed to prepare the compositions of the invention are all well known as are the methods of their preparation. The polymeric fatty acids, sometimes referred to in the art as "dimer acids" are complex mixtures resulting from the polymerization of fatty acids. Representative of polymeric fatty acids are those commercially available from the polymerization of tall oil fatty acids. These polymeric fatty acids have a typical composition as follows:

| | % BY WEIGHT |
|---|---|
| $C_{18}$ monobasic acids (monomer) | 0–10 |
| $C_{36}$ dibasic acids (dimer) | 60–95 |
| $C_{54}$ and higher polybasic acids (trimer) | 1–35 |

The relative ratios of monomer, dimer and trimer in unfractionated polymeric fatty acids are dependent on the nature of the starting material and the conditions of polymerization. Methods for the polymerization of fatty acids are described, for example, in the U.S. Pat. No. 3,157,681. The use of hydrogenated dimer acids improves the color and thermal and oxidative stability of the polyamides of the invention.

Diacids and their esters are commonly used as co-reactants to adjust the softening point of the resin. Representative of such co-diacids are adipic acid, sebacic acid, fumaric acid, terephthalic acid, isophthalic acid and cyclohexane dicarboxylic acid and their lower aliphatic esters especially those wherein the ester portion contains 1–6 carbon atoms.

Monoamines of the formula (I) given above are also well known as are methods of their preparation.

Representative of the monoamines of formula (I) are ethylamine, n-propylamine, isopropylamine, n-butylamine, t-butylamine, t-amylamine, n-hexylamine, ethyl-n-butylamine, 2-aminoheptane, ethyl-n-hexylamine, dodecylamine, octadecylamine, cyclopropylamine, cyclopentylamine, cyclohexylamine, 2-methyl-1-aminocyclohexane, n-ethylcyclohexylamine, 1-cyclohexyl-2-aminopropane, 9-aminodecalin, dicyclohexylamine and the like.

The 1,2-diaminocyclohexane employed as a coreactant to prepare the resins of the invention may be employed alone or in admixture with up to 40 equivalent percent of an aliphatic or cycloaliphatic diamine of the formula:

$$H_2N-R'-NH_2 \qquad (II)$$

wherein R' represents alkylene or cycloalkylene of 2 to 20 carbon atoms, inclusive. Representative of diamines of the formula (II) are ethylene diamine (EDA), 1,3-diaminopropane, 1,4-diaminobutane, 1,6-hexamethylene diamine (HMDA), 4,4'-methylene-bis-(cyclohexylamine) (PACM), 1,20-diaminoeicosane, cyclohexanebis-(methylamine), piperazine, 1,3-di-(4-piperidyl-propane (DIPIP), 1-(2-aminoethyl) piperazine, 1,2-diaminopropane, 1,2-butylenediamine, tetramethylenediamine and the like.

The polyamide resins of the invention may be prepared according to the method of the invention by mixing, heating and reacting the polymeric acid with a substantially equivalent proportion of a mixture of diamines and monoamines as described above, to produce a neutral or balanced polyamide, i.e.; the acid and amine numbers are substantially equal. By "substantially equivalent proportion" it is meant that the total number of amine groups provided in the reaction mixture should approximate the total number of acid groups presented by the polymeric acid. The temperature at which this condensation polymerization is carried out at a temperature of from about 90° C. to about 300° C. To assist the polymerization, a polymerization catalyst may be added to the reaction mixture in a catalytic proportion. Representative of such catalysts is phosphoric acid.

The catalyst employed in the method of the invention may be charged to the initial reaction mixture or added just prior to when the polymerization rate slows. The preferred concentration of catalyst in the reaction is within the range of from about 0.001 to 3 weight percent, most preferably 0.01 to 1.0 percent by weight of the total charge.

In order to avoid undue discoloration of the polyamide product, the method of the invention is preferably carried out under an inert atmosphere such as is provided by carbon dioxide, nitrogen or argon gases. During the course of the reaction, amidization occurs with formation of long linear molecules and water. The formed water is advantageously allowed to distill out of the reaction mixture as the condensation polymerization occurs. Distillation may be assisted by allowing a slow stream of inert gas such as nitrogen to be bubbled through or over the reaction mixture. Although not necessary, an inert organic solvent such as xylene may be added to the reaction mixture in small proportions to assist removal of water by azeotropic distillation. Generally such proportion should not exceed about 10 percent by weight of the reaction mixture. The heating of the reaction mixture may be carried out until there is a cessation of evolution of water of condensation, indicating a completion of the polymerization.

The method of the invention may be carried out at atmospheric or slightly higher pressures. However, toward the end of the polymerization step it is advantageous to operate under a slight vacuum. This aids in removal of byproducts, solvents and condensation water, unreacted diamine, and in driving the polymerization to completion. Completion of the polymerization may also be observed when aliquots of the reaction mixture, taken periodically, indicate by analysis that the acid and amine numbers for the reaction mixture are less than about 10, preferably less than 5. Generally polymerization is complete within about 1 to 7 hours, depending on the specific nature of the reactants. Any conventional and convenient reaction vessel may be used to condense the reactants and carry out the polymerizaion.

Although the polyamide resin product prepared in accordance with the description given above will include resins chains of diverse chain moieties or units, it will be appreciated that such resin chains will be expected to include those containing recurring chain units of the formula:

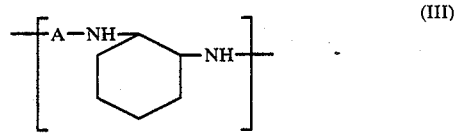

wherein A represents the residue of the polymeric fatty acid after the above-described polymerization reaction. These resin chains will of course be terminated with the monovalent moiety of formula:

wherein R has the meaning previously ascribed to it.

The following examples describe the manner and process of making and using the invention and set forth the best mode contemplated by the inventor of carrying out the invention, but are not to be construed as limiting.

TEST METHODS

The test methods used for evaluating the polyamide compositions of the invention were as follows:

(1) Toluene solubility was determined by mixing various weights of the resin in 10 ml of toluene and observing the mixture for resin dissolution after standing overnight agitation at room temperature.

(2) Softening points were determined by the method of ASTM-E 28-63 (ring and ball method).

(3) The degree of reaction may be assessed by determination of acid and amine vaue, defined as the number of mg. KOH required to neutralize the free acidity present in 1 gram of the resin for the former and the number of mg. KOH equivalent to the quantity of acid required to neutralize the free basicity present in 1 gram of the resin for the latter.

EXAMPLE 1

A polymer was pepared with the following reactants:

|  | Equivalent % |
|---|---|
| polymeric fatty acid* | 100 |
| tallowamine** | 25 |
| 1,2-diaminocyclohexane | 75 |

*Union Camp Corporation, Wayne, New Jersey; Unidyme $^R$ 14 having the composition:
monomer 0.4 wt %
dimer 95.6 wt %
Trimer (and higher polymer) 4.0 wt %
**AKZO Chemie of America; Armeen R TM-97, equivalent weight 259.48, a tallowamine mixture comprised of octadecylamine and hexadecylamine.

The reactants were all charged in a resin kettle and heated to a temperature of 140° C. with stirring, under a blanket of nitrogen gas for about 4 hours, while water was removed by distillation. Three drops of phosphoric acid were then added, and the mixture as heated at reflux temperatures until no water of condensation was evolved The resulting polyamide resin was allowed to cool to room temperature and representative portions were taken and examined to physical properties. The examination results showed an acid number of 1.4, and amine number of 1.1, a softening point temperature of 92° C. and a solubility in toluene of more than 50 weight percent at room temperature (25° C.)

EXAMPLE 2

Repeating the procedure of Example 1, supra. but replacing the polymeric fatty acid as used therein with Unidyme $^R$22, a polymerized fatty acid available from Union Camp Corp. Wayne, N.J. and characterized in party by a resin is obtained having an acid number of 4.1, an amine number of 2.1, a softening temperature of 63° C. and a solubility in toluene of more than 50 weight percent at 25° C.

The polyamide resins of the invention may be employed in printing ink compositions as the sole polyamide resin binder component, in conventional proportions. The make-up of such printing ink compositions are generally well known; see for example U.S. Pat. No. 3,037,871. The ink compositions of the present invention differ only in respect to the use of the novel polyamide resins of the invention and the use of solvating proportion of toluene as the sole and only solvent for the polyamide. Of course an insoluble ink pigment is added as an active ingredient of the ink compositions of the inventin. Representative of such pigments are carbon black, titanium dioxide, calcium lithol read and the like. Thus, the printing inks prepared with the like. Thus, the printing inks prepared with the polyamide resin binders of the invention consist essentially of the resin binder, a solvating proportion of toluene and a pigment. Pigment extenders such as clays and pigment dispersing agents may also be present.

What is claimed is:
1. A polyamide resin having a solubility of at least about five weight percent in toluene, at room temperature, said polyamide being the reaction product of
   (a) about 5 to 35 equivalent percent of a monoamine of the formula:

$$R—NH_2 \qquad (I)$$

wherein R is an aliphatic of cycloaliphatic hydrocarbyl group having 2 to 25 carbon atoms, inclusive;
   (b) about 95 to 65 equivalent percent of a diamine selected from the group consisting of 1,2-diaminocyclohexane and mixtures containing at least about 60 equivalent percent of 1,2-diaminocyclohexane in combination with other cycloaliphatic or aliphatic diamines; and
   (c) 75 to 100 equivalent percent of a polymerized fatty acid;
   (d) 0 to 25 equivalent percent of an aliphatic or cycloaliphatic diacid having 4–22 carbon atoms and lower ester thereof.
2. The resin of claim 1 wherein the monoamine is tallowamine.
3. The resin of claim 2 wherein the proportion of tallowamine is 25 equivalent percent and the proportion of 1,2-diaminocyclohexane is 75 equivalent percent.
4. A polyamide resin having the polymer chain recurring chain units of the formula:

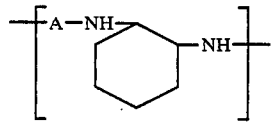

wherein A repesents the residue of a polymeric fatty acid after polymerization reaction with 1,2-diaminocyclohexane; said resin chain being terminated with the monovalent moiety of formula

R—NH— wherein R represents aliphatic hydrocarbyl of 2 to 25 carbon atoms, inclusive.

* * * * *